(12) United States Patent  
Kawasaki (10) Patent No.: US 8,305,786 B2
(45) Date of Patent: Nov. 6, 2012

(54) POWER CONTROLLER FOR ELECTRIC VEHICLE

(75) Inventor: Shingo Kawasaki, Kariya (JP)

(73) Assignee: Denso Corporation, Kariya (JP)

( * ) Notice: Subject to any disclaimer, the term of this patent is extended or adjusted under 35 U.S.C. 154(b) by 588 days.

(21) Appl. No.: 12/621,029

(22) Filed: Nov. 18, 2009

(65) Prior Publication Data

US 2010/0127649 A1 May 27, 2010

(30) Foreign Application Priority Data

Nov. 27, 2008 (JP) ................................ 2008-301880

(51) Int. Cl.
*H02M 3/24* (2006.01)
*H02P 7/06* (2006.01)
(52) U.S. Cl. .............................. 363/95; 363/78; 318/459
(58) Field of Classification Search .................... 363/34, 363/78, 95–98; 318/459, 139, 140
See application file for complete search history.

(56) References Cited

U.S. PATENT DOCUMENTS

| 6,429,616 B1 * | 8/2002 | Myers et al. .................. 318/459 |
| 6,917,179 B2 | 7/2005 | Komatsu et al. |
| 7,099,756 B2 | 8/2006 | Sato |
| 7,212,891 B2 | 5/2007 | Sato |
| 7,348,689 B2 * | 3/2008 | Westcott ....................... 307/130 |
| 7,355,869 B2 | 4/2008 | Okamura |
| 8,045,345 B2 * | 10/2011 | Kono .............................. 363/34 |
| 2010/0128502 A1 * | 5/2010 | Kawamoto et al. ............. 363/34 |

* cited by examiner

*Primary Examiner* — Jessica Han
(74) *Attorney, Agent, or Firm* — Nixon & Vanderhye PC (57) ABSTRACT

A controller calculates a total power fluctuation including a power fluctuation on a first unit and a power fluctuation on a second unit. The controller estimate a voltage fluctuation of the system voltage based on the total power fluctuation. Then, the controller calculates a control amount for a voltage converter by reflecting the estimated voltage fluctuation. The estimated voltage fluctuation can be used to correct a feed-forward control amount. As a result, a voltage stabilizing control is performed based on the estimated voltage fluctuation which could be occurred in response to the total power fluctuation if no stabilizing control is performed. Thereby, the stability of the system voltage can be improved without using a large size smoothing capacitor.

7 Claims, 6 Drawing Sheets

POWER CONTROLLER FOR ELECTRIC VEHICLE

CROSS REFERENCE TO RELATED APPLICATION

This application is based on Japanese Patent Application No. 2008-301880 filed on Nov. 27, 2008, the contents of which are incorporated herein by reference in its entirety.

FIELD OF THE INVENTION

The present invention relates to a controller for electric vehicle. More specifically, the present invention relates to a voltage regulator for supplying a system voltage which is connected to an inverter for supplying current to an alternating current electric rotary machine.

BACKGROUND OF THE INVENTION

An electric vehicle, including a hybrid vehicle, which has an alternating current electric rotary machine for a vehicle power source is known. The patent document U.S. Pat. No. 6,917,179 (JP2003-244801A) discloses an apparatus which includes an alternating current electric rotary machine for driving a driving wheel of the vehicle, and an alternating current electric rotary machine for being driven by an internal combustion engine for generating electricity. The patent document U.S. Pat. No. 7,099,756 (JP2004-274945A) discloses a similar apparatus. The alternating current electric rotary machine may be referred to as the AC machine. This kind of vehicles carries a rechargeable battery as a direct current power supply. The direct current power supply may be referred to as the DC power supply. The apparatus includes a converter which increases a voltage of the DC power supply and supplies the increased voltage to a power line. The AC machines are connected to the power line via inverters. The increased voltage is converted into an AC voltage by the inverter and supplied to the corresponding AC machine. On the other hand, an AC voltage generated on the AC machine is converted into a DC voltage by the inverter and supplied to the power line. The converter may charge the battery by decreasing the voltage on the power line. Therefore, the converter and the inverter are used for both a supplying purpose and a regenerating purpose. The voltage generated on the power line is also referred to as a system voltage.

The patent document U.S. Pat. No. 7,355,869 (JP2005-51898A) discloses an apparatus which has a voltage regulator for stabilizing the system voltage. The voltage regulator monitors the system voltage by detecting the system voltage, and controls the converter in a feed-back control fashion. The converter is controlled so that a difference between a detected voltage and a target voltage becomes small. In other word, the converter is controlled so that the detected voltage approaches to the target voltage.

SUMMARY OF THE INVENTION

If an operational status of the vehicle etc. is changed, a power consumed by the AC machine and a power generated by the AC machine is fluctuated. The system voltage is also fluctuated. However, since the feed-back control reacts after a certain fluctuation of the system voltage is detected, there is unavoidable delay. Therefore, the system voltage cannot be stabilized sufficiently. If the system voltage becomes excessively high, a control of the AC machine may become unstable, or an excessive voltage may be applied to an electrical component connected to the power line.

A smoothing capacitor with large capacitance may stabilize the system voltage. However, it is required to use a large size smoothing capacitor and to increase cost.

It is an object of the present invention to provide an improved power controller for an electric vehicle. It is another object of the present invention to provide a power controller for an electric vehicle which can supply a stable voltage.

It is a still another object of the present invention to provide a power controller for an electric vehicle which can satisfy both requirements for improving the stability of the system voltage and for compactness and low cost.

In accordance with an aspect of the present invention, a power controller for electric vehicle comprises a voltage converter which converts a voltage supplied from a DC power source to a system voltage and supplies the system voltage to a power line. The power controller for electric vehicle comprises at least one unit including an inverter connected with the power line and an AC machine connected with the inverter. The power controller for electric vehicle comprises means for estimating a voltage fluctuation of the system voltage based on a power fluctuation generated on the unit, and means for controlling the voltage converter to stabilize the system voltage based on the estimated voltage fluctuation estimated in the estimating means.

An electric power on a unit including an AC machine is changed according to a change of an operational status of the vehicle etc. Then, the system voltage is changed in accordance with the change of the electric power on the unit. Therefore, the changing amount, i.e., fluctuation, of the system voltage can be estimated with sufficient accuracy by using a power fluctuation on the unit. The controlling means performs a voltage stabilization control based on the estimated voltage fluctuation. The controlling means controls the converter based on the estimated voltage fluctuation in order to stabilize the system voltage. The voltage stabilization control is performed with few delay or without delay. It is possible to control and regulate the system voltage Vsys effectively. Further, it is not necessary to increase a capacitance and size of a smoothing capacitor. Therefore, it is possible to satisfy both modern requirements for small size and low cost. As a result, it is possible to satisfy both an improvement in stability of the system voltage Vsys, and a requirement for small size and low cost.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
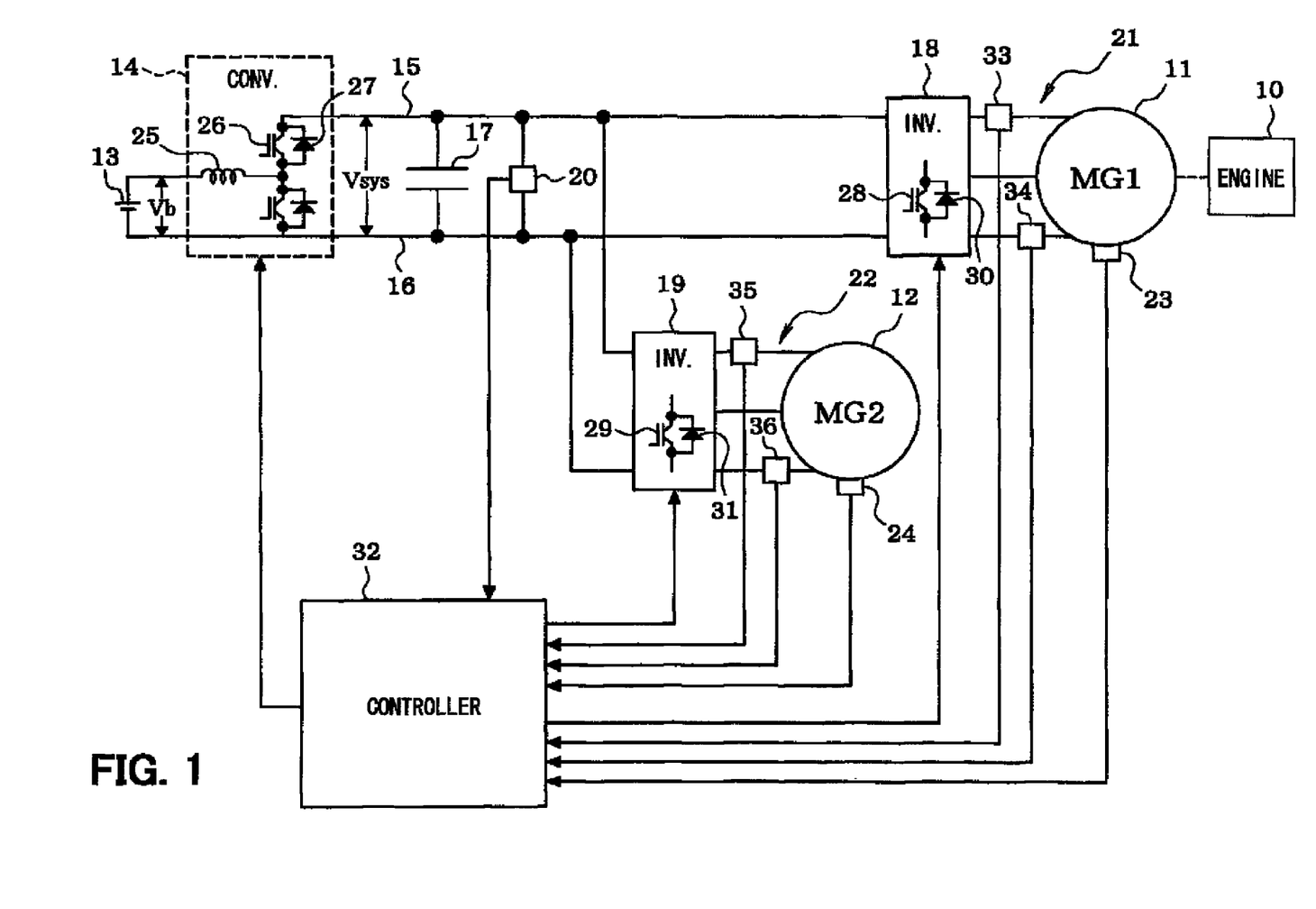
FIG. 1 is a block diagram showing a control system according to a first embodiment of the present invention.

A first embodiment of the present invention is described referring to FIGS. 1-5. FIG. 1 shows a control system for an electric vehicle. The electric vehicle is a hybrid vehicle which can run by both an electric motor and an internal combustion engine.

An engine 10 which is an internal combustion engine is mounted on the vehicle. A first alternating current electric rotary machine 11, and a second alternating current electric machine 12 are also mounted on the vehicle. The alternating current electric rotary machine may be referred to as the AC machine. The first AC machine 11 is mainly used as a generator driven by the engine 10. The first AC machine 11 is also referred to as a motor-generator MG1. The first AC machine 11 can assist the engine 10. The second AC machine 12 is mainly used as a driving source for rotating a driving wheel of the vehicle. The second AC machine 12 is also referred to as a motor-generator MG2. The second AC machine 12 can be driven by the driving wheel when the vehicle is reducing speed and can work as a generator to regenerate a braking power as an electric power.

A direct current power source 13 is also mounted on the vehicle. The direct current power source 13 is provided with a rechargeable battery etc. The direct current power source 13 is referred to as the DC power source or the battery 13. Further, the vehicle has a power circuit which connects the DC power source 13 and the AC machines 11 and 12. The power circuit includes a converter 14 and inverters 18 and 19. The converter 14 provides a voltage converter. The converter 14 has a step-up function for increasing output voltage higher than an input voltage, and a step-down function for decreasing output voltage lower than an input voltage. The converter 14 is connected to the DC power source 13. The converter 14 inputs a voltage of the DC power source 13. The converter 14 outputs a voltage which is higher than the voltage of the DC power source 13. The converter 14 supplies the voltage between the power line 15 and a ground line 16. In other word, the converter 14 boosts the voltage of the DC power source 13 and supplies the boosted voltage to the power line 15. The DC voltage appears between the power line 15 and the ground line 16 is referred to as a system voltage. The converter 14 has a stepping down function for supplying a reduced voltage to the DC power source 13. In the stepping down mode, the converter 14 inputs the system voltage and outputs the reduced voltage lower than the system voltage to the DC power source 13. The converter 14 regenerates the power from the power line 15 to the DC power source 13. In other word, the converter 14 charges the DC power source 13. The power circuit includes a smoothing capacitor 17 which forms a ripple filtering circuit for stabilizing the system voltage. The smoothing capacitor 17 is connected between the power line 15 and the ground line 16. The power circuit includes a voltage sensor 20 which detects the system voltage Vsys.

A first inverter 18 is connected between the power line 15 and the ground line 16. The first inverter 18 is a voltage controlled three phase inverter. A second inverter 18 is connected between the power line 15 and the ground line 16. The second inverter 19 is a voltage controlled three phase inverter.

The first inverter 18 is connected with the first AC machine 11. The first inverter 18 and the first AC machine 11 provide a first unit 21. The first unit 21 is a unit which can selectively function as a load or a generator. The first AC machine 11 is a three phase synchronous motor with permanent magnets. The first AC machine 11 includes at least one permanent magnet. The first AC machine 11 is provided with a rotor position sensor 23 which detects the rotating position of a rotor. A rotating speed of the first AC machine 11 can be calculated based on the output of the rotor position sensor 23.

The second inverter 19 is connected with the second AC machine 12. The second inverter 19 and the second AC machine 12 provide a second unit 22. The second unit 22 is a unit which can selectively function as a load or a generator. The second AC machine 12 is a three phase synchronous motor with permanent magnets. The second AC machine 12 includes at least one permanent magnet. The second AC machine 12 is provided with a rotor position sensor 24 which detects the rotating position of a rotor. A rotating speed of the second AC machine 12 can be calculated based on the output of the rotor position sensor 24.

The converter 14 includes a reactor 25 and a switching bridge circuit including a pair of switching elements 26. Each switching element 26 is connected with a flywheel diode 27. The converter 14 is controlled by a command signal supplied from a controller 32. The first inverter 18 includes a switching bridge circuit including six switching elements 28. The switching elements 28 are assembled to provide upper arms for three phases and lower arms for three phases. Each switching element 28 is connected with a flywheel diode 30. The second inverter 19 includes a switching bridge circuit including six switching elements 29. The switching elements 29 are assembled to provide upper arms for three phases and lower arms for three phases. Each switching element 29 is connected with a flywheel diode 31.

The first inverter 18 is controlled by a command signal supplied from the controller 32. The command signal may include signals for three phases. The command signal may be a voltage command signal. The first inverter 18 performs a DC-AC conversion or an AC-DC conversion. For example, the first inverter 18 converts a DC system voltage Vsys into a three phase AC voltage, and supplies the three phase AC voltage to the first AC machine 11. On the other hand, the first inverter 18 can convert a three phase AC voltage generated and supplied from the first AC machine 11 into a DC voltage, and supplies the converted DC voltage to the power line 15. A U phase current and a W phase current on the first AC machine 11 are detected by current sensors 33 and 34.

The second inverter 19 is controlled by a command signal supplied from a controller 32. The command signal may include signals for three phases. The command signal may be a voltage command signal. The second inverter 19 performs a DC-AC conversion or an AC-DC conversion. For example, the second inverter 19 converts a DC system voltage Vsys into a three phase AC voltage, and supplies the three phase AC voltage to the second AC machine 12. On the other hand, the second inverter 19 can convert a three phase AC voltage generated and supplied from the second AC machine 12 into a DC voltage, and supplies the converted DC voltage to the power line 15. An electric current flowing on a U-phase and an electric current flowing on a W-phase on the second AC machine 12 are detected by current sensors 35 and 36.

Figure 2:
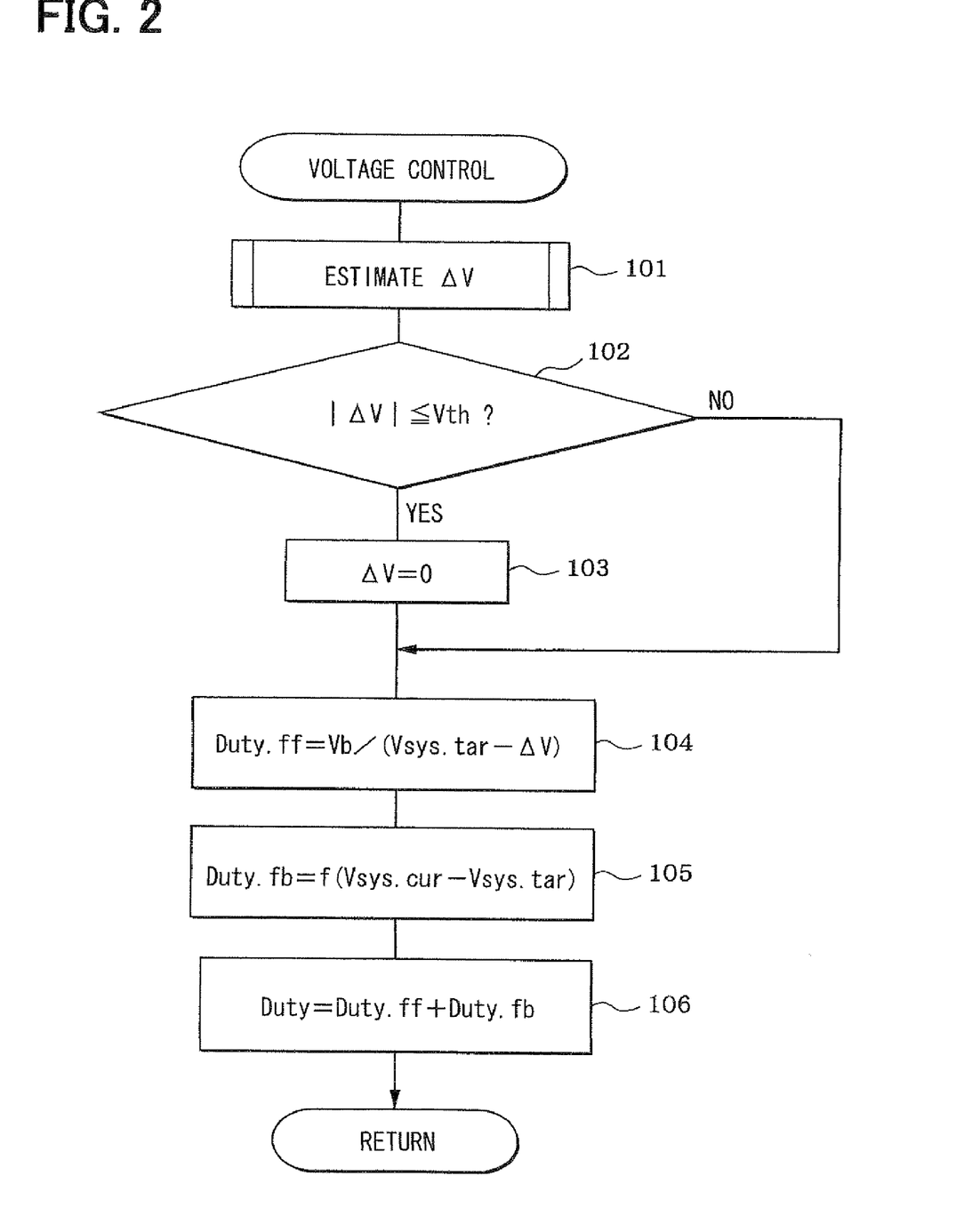
FIG. 2 is a flow chart showing a voltage control routine according to the first embodiment of the present invention.
Figure 3:
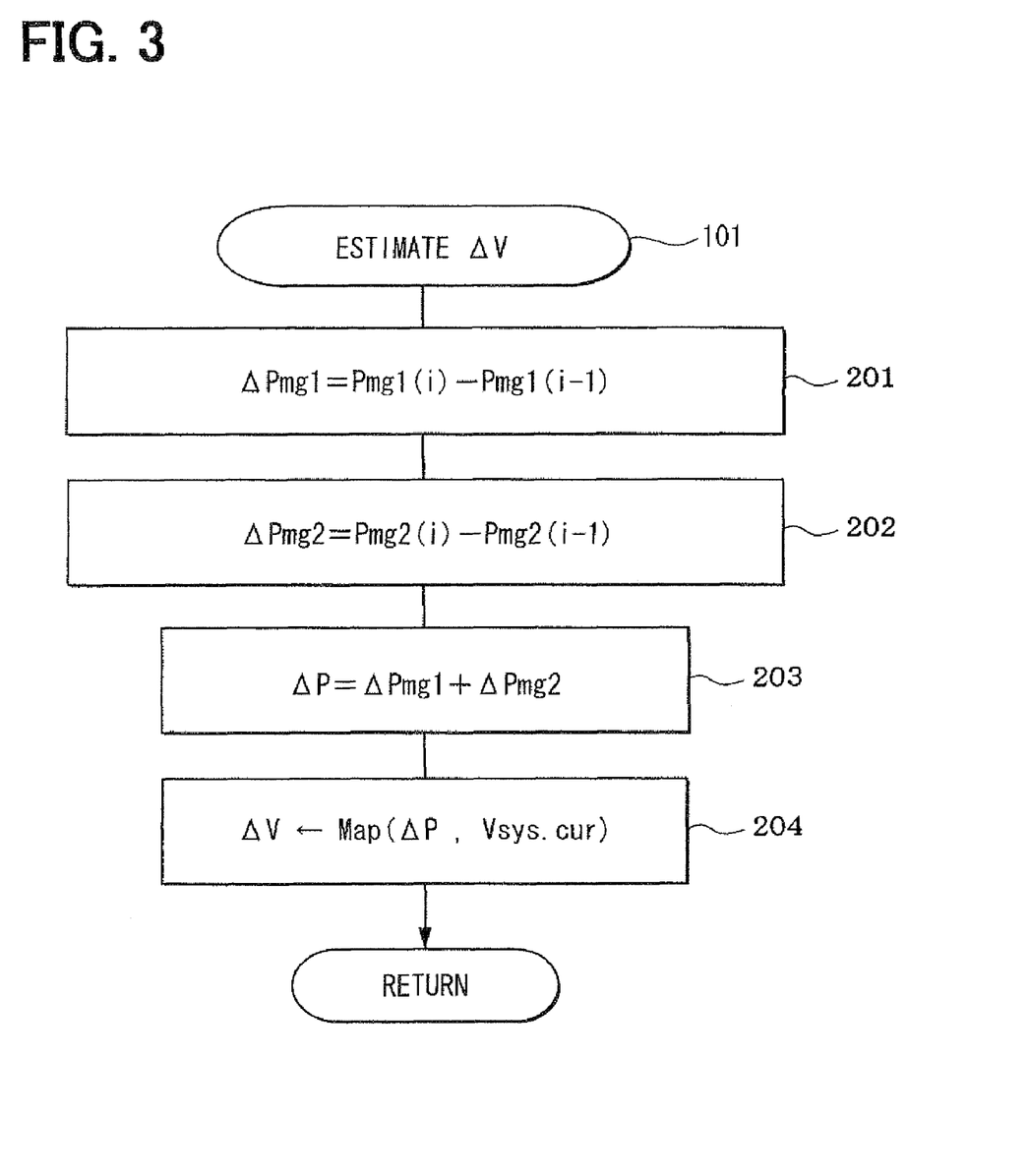
FIG. 3 is a flow chart showing an estimating routine according to the first embodiment of the present invention.

The controller 32 executes a program at least including a routine illustrated in FIG. 2 and FIG. 3. The converter 14 and the controller 32 perform as a voltage regulator which regulates the system voltage to a target voltage. The controller 32 provides several functional components.

The controller 32 provides means for calculating a control command for the converter 14 and outputting the command to the converter 14. An amount of the command for the converter 14 can be expresses as a duty for switching the switching elements 26. The controller 32 provides means for calculating a feed-forward control amount Duty.ff based on an output characteristic of the converter 14. The feed-forward control amount Duty.ff is calculated so that the output voltage of the converter 14 approaches to a target of the system voltage. The output characteristic of the converter 14 may be a relationship among an input voltage, an output voltage, and a duty ratio for driving the switching elements 26. The duty ratio can be calculated based on the characteristic and the input voltage and the output voltage. The input voltage can be obtained by a voltage of the DC power source 13. The output voltage can be obtained by the target of the system voltage. The target of the system voltage Vsys may be referred to as the target voltage Vsys.tar.

The controller 32 provides means for calculating a feed-back control amount Duty.fb for controlling the converter 14 so that a difference between a detected value of the system voltage Vsys and the target voltage Vsys.tar becomes small. The detected value of the system voltage Vsys may be referred to as the detected voltage Vsys.cur.

The controller 32 provides means for calculating a duty ratio Duty for the converter 14 based on the feed-forward control amount Duty.ff and the feed-back control amount Duty.fb. The duty ratio Duty indicates a ratio of turning on the switching elements. The controller 32 controls the system voltage to the target voltage Vsys.tar by controlling the switching elements 26 in the converter 14 based on the duty ratio Duty.

The controller 32 further provides means for estimating a fluctuation $\Delta V$ of the system voltage Vsys. The estimated value of the fluctuation $\Delta V$ may be referred to as an estimated voltage fluctuation $\Delta V$. The estimated voltage fluctuation $\Delta V$ shows a fluctuation which is projected to occur in near future. In other word, the estimated voltage fluctuation $\Delta V$ has not yet occurred. The controller 32 provides means for calculating a first power fluctuation $\Delta Pmg1$ on the first unit 21. The first power fluctuation $\Delta Pmg1$ indicates a power fluctuation per unit time. The controller 32 provides means for calculating a second power fluctuation $\Delta Pmg2$ on the second unit 22. The second power fluctuation $\Delta Pmg2$ indicates a power fluctuation per unit time. The controller 32 provides means for calculating a total power fluctuation $\Delta P$ by summing the first power fluctuation $\Delta Pmg1$ and the second power fluctuation $\Delta Pmg2$. The controller 32 provides means for estimating the estimated voltage fluctuation $\Delta V$ based on the total power fluctuation $\Delta P$. The estimated voltage fluctuation $\Delta V$ indicates a voltage fluctuation per unit time. In this embodiment, each of the power fluctuations $\Delta Pmg1$, $\Delta Pmg2$, and $\Delta P$ takes positive value when the power fluctuation indicates that the corresponding unit supplies electric power to the smoothing capacitor 17, for example.

The first power fluctuation $\Delta Pmg1$ is changed in accordance with operational status of the vehicle etc. Similarly, the second power fluctuation $\Delta Pmg2$ is changed in accordance with operational status of the vehicle etc. As a result, the total power fluctuation $\Delta P$ is also changed. The system voltage Vsys is changed according to the total power fluctuation $\Delta P$. The fluctuation $\Delta V$ of the system voltage Vsys can be predicted with sufficient accuracy by using the total power fluctuation $\Delta P$.

The controller 32 provides means for controlling the converter 14 based on the estimated voltage fluctuation $\Delta V$ to stabilize the system voltage Vsys. The controller 32 performs a voltage stabilization control. The controller 32 controls the converter 14 to stabilize the system voltage Vsys with few delay from an actual fluctuation of the system voltage. Preferably, the controller 32 control the converter 14 to stabilize the system voltage without delay before an actual fluctuation of the system voltage actually occurs. As a result, it is possible to control and regulate the system voltage Vsys effectively.

In detail, the controller 32 corrects the feed-forward control amount Duty.ff based on the estimated voltage fluctuation $\Delta V$ when calculating the feed-forward control amount Duty.ff. For this purpose, the controller 32 provides means for correcting the feed-forward control amount Duty.ff for controlling the voltage converter 14 by using the estimated voltage fluctuation $\Delta V$. The feed-forward control amount Duty.ff is calculated based on the output characteristic of the voltage converter 14 so that the output voltage of the converter 14 approaches to the target voltage Vsys.tar. The correcting amount is set to stabilize the system voltage Vsys. In other words, the correcting amount is set to prevent the estimated voltage fluctuation $\Delta V$. Thereby, the estimated voltage fluctuation $\Delta V$ is reflected on the feed-forward control amount Duty.ff.

The voltage control routine shown in FIG. 2 is repeatedly executed during the controller 32 is turned on. The controller 32 provides means for controlling the system voltage by performing the routine. First, the controller 32 executes a estimating routine in a step 101. The details of the estimating routine are mentioned later. In the step 101, the estimated voltage fluctuation $\Delta V$ is calculated based on the power fluctuation $\Delta P$.

In a step 102, the controller 32 determines that whether an absolute value of the estimated voltage fluctuation $\Delta V$ is smaller than or equal to a predetermined threshold value Vth or not. If it is determined that the absolute value of the estimated voltage fluctuation $\Delta V$ is smaller than or equal to the threshold value Vth, the routine proceeds to a step 103. In this case, a fluctuation of the system voltage Vsys is in a range of tolerance. In other words, it is assumed that the system voltage Vsys is in a stable state mostly. In such a case, if a voltage stabilization control according to the estimated voltage fluctuation $\Delta V$ is performed, the system voltage Vsys may be disturbed on the contrary. In order to prevent such a disturbance, the estimated voltage fluctuation $\Delta V$ is compulsorily set as zero "0" in the step 103. As a result, the voltage stabilizing control based on the estimated voltage fluctuation $\Delta V$ is inhibited. In other words, it is possible to suppress a small correction based on the estimated voltage fluctuation $\Delta V$.

On the other hand, if it is determined that the absolute value of the estimated voltage fluctuation $\Delta V$ is greater than the threshold value Vth in the step 102, the routine skips the step 103 and proceeds to a step 104. In a step 104, the feed-forward control amount Duty.ff for the converter 14 is calculated based on the output characteristics of the converter 14. The feed-forward control amount Duty.ff contains a base component and a correction component. The base component is calculated by using the input voltage Vb for the converter 14 and the target voltage Vsys.tar so that the output voltage of the converter 14 approaches to and becomes the target voltage Vsys.tar. The base component may be calculated by the following expression.

$$\mathrm{Duty}.ff = Vb/Vsys.tar$$

The correction component may be given by the estimated voltage fluctuation $\Delta V$. In this embodiment, the estimated voltage fluctuation $\Delta V$ corrects the target voltage Vsys.tar which is used for calculating the base component. As a result, the feed-forward control amount Duty.ff is calculated by the following expression.

$$\mathrm{Duty}.ff = Vb/(Vsys.tar - \Delta V)$$

Thereby, the estimated voltage fluctuation $\Delta V$ is reflected on the feed-forward control amount Duty.ff. In the case of the estimated voltage fluctuation $\Delta V=0$, the estimated voltage fluctuation $\Delta V$ is not reflected.

In a step 105, the feed-back control amount Duty.fb is calculated so that a difference (Vsys.cur−Vsys.tar) between the detected voltage Vsys.cur and the target voltage Vsys.tar becomes small. A PI control method or a PID control method may be used as a feed-back control system, for example. The feed-back control amount Duty.fb is calculated by a map or a functional expression. For example, the feed-back control amount Duty.fb may be calculated by the following expression.

$$Duty.fb=f(Vsys.cur-Vsys.tar).$$

In the expressions, "f( )" means a function.

In a step 106, the controller 32 calculates a duty ratio Duty for the converter 14 based on the feed-forward control amount Duty.ff and the feed-back control amount Duty.fb. The duty ratio Duty indicates a ratio of turning on the switching elements. The duty ratio Duty is calculated by the following expression.

$$Duty=Duty.ff+Duty.fb$$

The controller 32 controls the switching elements 26 in the converter 14 based on the duty ratio Duty. Thereby, the controller 32 controls the system voltage Vsys to the target voltage Vsys.tar. In other words, the controller 32 controls the converter 14 in order to prevent the estimated voltage fluctuation $\Delta V$ before the estimated voltage fluctuation $\Delta V$ is actually observed.

The estimating routine shown in FIG. 3 is a subroutine performed at the step 101. The controller 32 provides means for estimating the voltage fluctuation by performing the routine.

In a step 201, the controller 32 calculates a first power fluctuation $\Delta Pmg1$ on the first unit 21. The first power fluctuation $\Delta Pmg1$ is a power fluctuation per unit time $\Delta t$. The unit time $\Delta t$ may be a cyclic period for executing the step 201, i.e., the routine. In the step 201, an electric power Pmg1 on the first unit 21 is calculated based on a torque command value Tmg1 and a rotating speed Nmg1 of the first AC machine 11. The electric power Pmg1 may indicate both cases of the electric power supply from the first unit 21 and the electric power consumption by the first unit 21. In the step 201, the controller 32 calculates a difference $\Delta Pmg1$ between an electric power $Pmg1(i)$ calculated at this time and an electric power $Pmg1(i-1)$ calculated at last time. The difference $\Delta Pmg1$ corresponds to the first power fluctuation $\Delta Pmg1$. The following expression is calculated in the step 201.

$$\Delta Pmg1=Pmg1(i)-Pmg1(i-1)$$

In this embodiment, the first power fluctuation $\Delta Pmg1$ takes positive value when the first power fluctuation $\Delta Pmg1$ indicates that the unit 21 supplies electric power to the smoothing capacitor 17, for example. Since the electric power Pmg1 on the first unit 21 is changed according to the torque command value Tmg1 and the rotating speed Nmg1, it is possible to calculate the first power fluctuation $\Delta Pmg1$ with sufficient accuracy by using the torque command value Tmg1 and the rotating speed Nmg1.

In a step 202, the controller 32 calculates a second power fluctuation $\Delta Pmg2$ on the second unit 22. The second power fluctuation $\Delta Pmg2$ is a power fluctuation per unit time $\Delta t$. In the step 202, an electric power Pmg2 on the second unit 22 is calculated based on a torque command value Tmg2 and a rotating speed Nmg2 of the second AC machine 12. The electric power Pmg2 may indicate both cases of the electric power supply from the second unit 22 and the electric power consumption by the second unit 22. In the step 202, the controller 32 calculates a difference $\Delta Pmg2$ between an electric power $Pmg2(i)$ calculated at this time and an electric power $Pmg2(i-1)$ calculated at last time. The difference $\Delta Pmg2$ corresponds to the second power fluctuation $\Delta Pmg2$. The following expression is calculated in the step 202.

$$\Delta Pmg2=Pmg2(i)-Pmg2(i-1)$$

In this embodiment, the second power fluctuation $\Delta Pmg2$ takes positive value when the second power fluctuation $\Delta Pmg2$ indicates that the unit 22 supplies electric power to the smoothing capacitor 17, for example.

Since the electric power Pmg2 on the second unit 22 is changed according to the torque command value Tmg2 and the rotating speed Nmg2, it is possible to calculate the second power fluctuation $\Delta Pmg2$ with sufficient accuracy by using the torque command value Tmg2 and the rotating speed Nmg2.

In a step 203, the controller 32 sums the first power fluctuation $\Delta Pmg1$ on the first unit 21 and the second power fluctuation $\Delta Pmg2$ on the second unit 22 to obtain a total power fluctuation $\Delta P$. The following expression is calculated in the step 203.

$$\Delta P=\Delta Pmg1+\Delta Pmg2$$

At a step 204, the controller 32 calculates the estimated voltage fluctuation $\Delta V$ based on the total power fluctuation $\Delta P$. The following expression is calculated in the step 204.

$$\Delta V=(\Delta P\times 2\times \Delta t/C-(Vsys.cur)^2)^{1/2}-Vsys.cur$$

$\Delta t$ is a cyclic period for executing the routine. C is a capacitance of the smoothing capacitor 17. Vsys.cur is the detected voltage.

Figure 4:
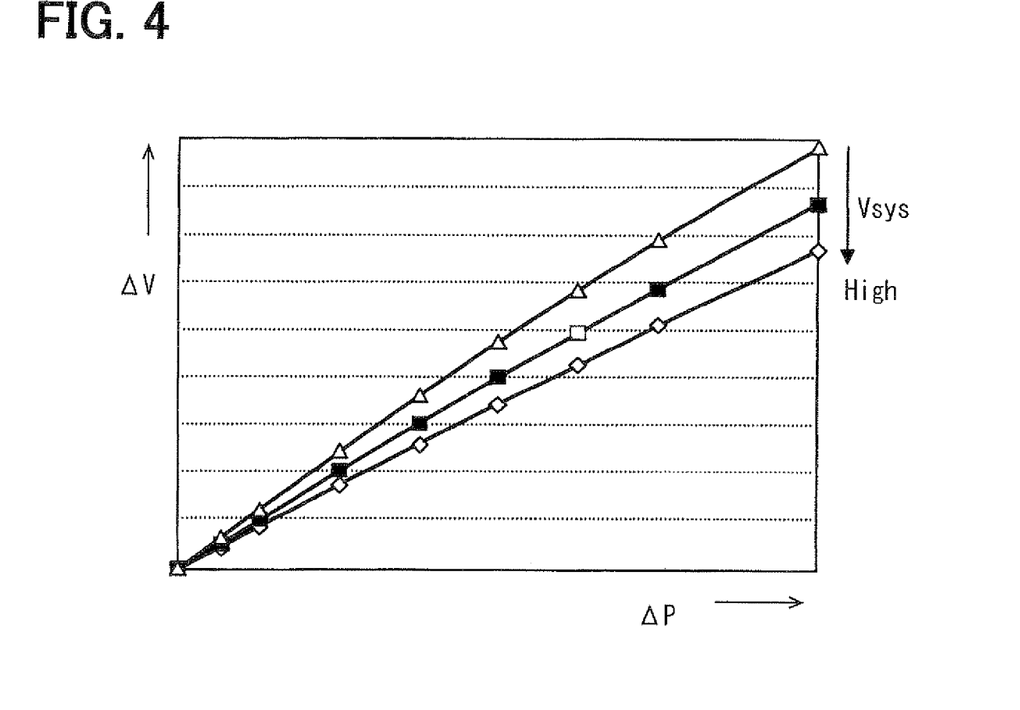
FIG. 4 is a graph showing a relationship between a total power fluctuation $\Delta P$, and a voltage fluctuation $\Delta V$.
Figure 5:
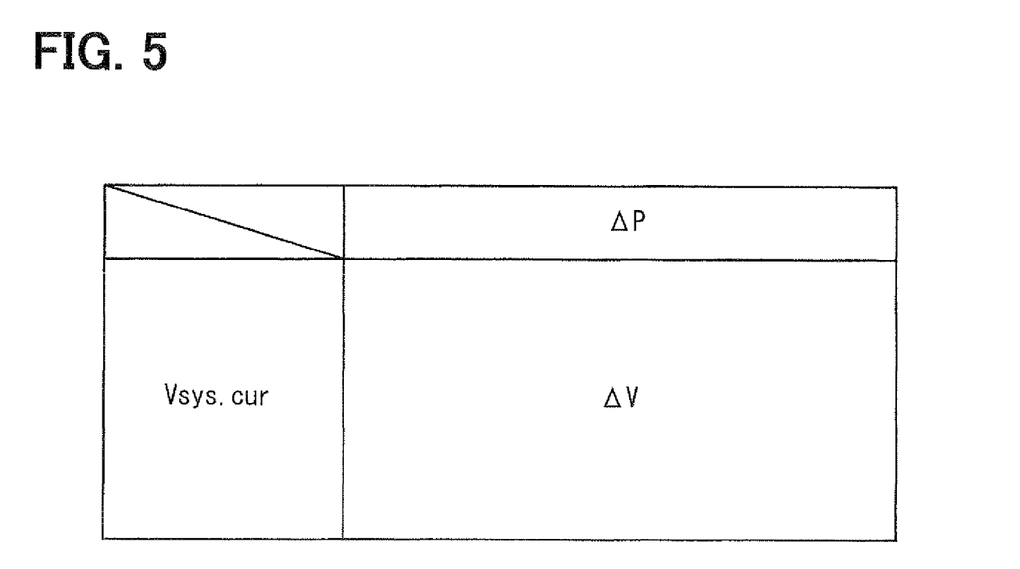
FIG. 5 is a chart notionally showing a map for estimating the voltage fluctuation $\Delta V$.

Usually, the cyclic period $\Delta t$ and the capacitance C are constants, therefore, an amount of fluctuation of the system voltage changes according to the total power fluctuation $\Delta P$ and the system voltage Vsys, as shown in FIG. 4. The estimated voltage fluctuation $\Delta V$ may be obtained by calculating a function or looking up a map which are defined with parameters, the total power fluctuation $\Delta P$ and the detected voltage Vsys.cur. For example, as shown in FIG. 5, a map defined by using parameters, the total power fluctuation $\Delta P$ and the detected voltage Vsys.cur, can be used. As a result, it is possible to obtain the estimated voltage fluctuation $\Delta V$ which is calculated in accordance with the total power fluctuation $\Delta P$ and the detected value Vsys.cur.

In a step 204, the target voltage Vsys.tar may be used instead of the detection voltage Vsys.cur.

According to the embodiment, a voltage stabilization control, i.e., a voltage regulating control, is performed with few delay or without delay. Preferably, the converter 14 is controlled to maintain the system voltage at the target voltage before an actual fluctuation on the system voltage Vsys is actually detected. As a result, it is possible to control and regulate the system voltage Vsys effectively. Further, it is not necessary to increase a capacitance and size of the smoothing capacitor 17. Therefore, it is possible to satisfy both modern requirements for small size and low cost. As a result, it is possible to satisfy both an improvement in stability of the system voltage Vsys, and a requirement for small size and low cost.

According to the embodiment, it is possible to prevent a fluctuation of the system voltage Vsys which may be caused by the voltage stabilization control based on the estimated voltage fluctuation $\Delta V$, when the system voltage Vsys is in a stable condition.

Alternatively, the controller 32 may provide means for inhibiting a control of the voltage converter 14 according to the estimated voltage fluctuation ΔV, when the total power fluctuation ΔP on the units 21 and 22 is less than a predetermined value. In detail, the control of the voltage converter 14 according to the estimated voltage fluctuation ΔV is inhibited when an absolute value of the total power fluctuation ΔP on the units 21 and 22 is less than a predetermined value.

Second Embodiment

Figure 6:
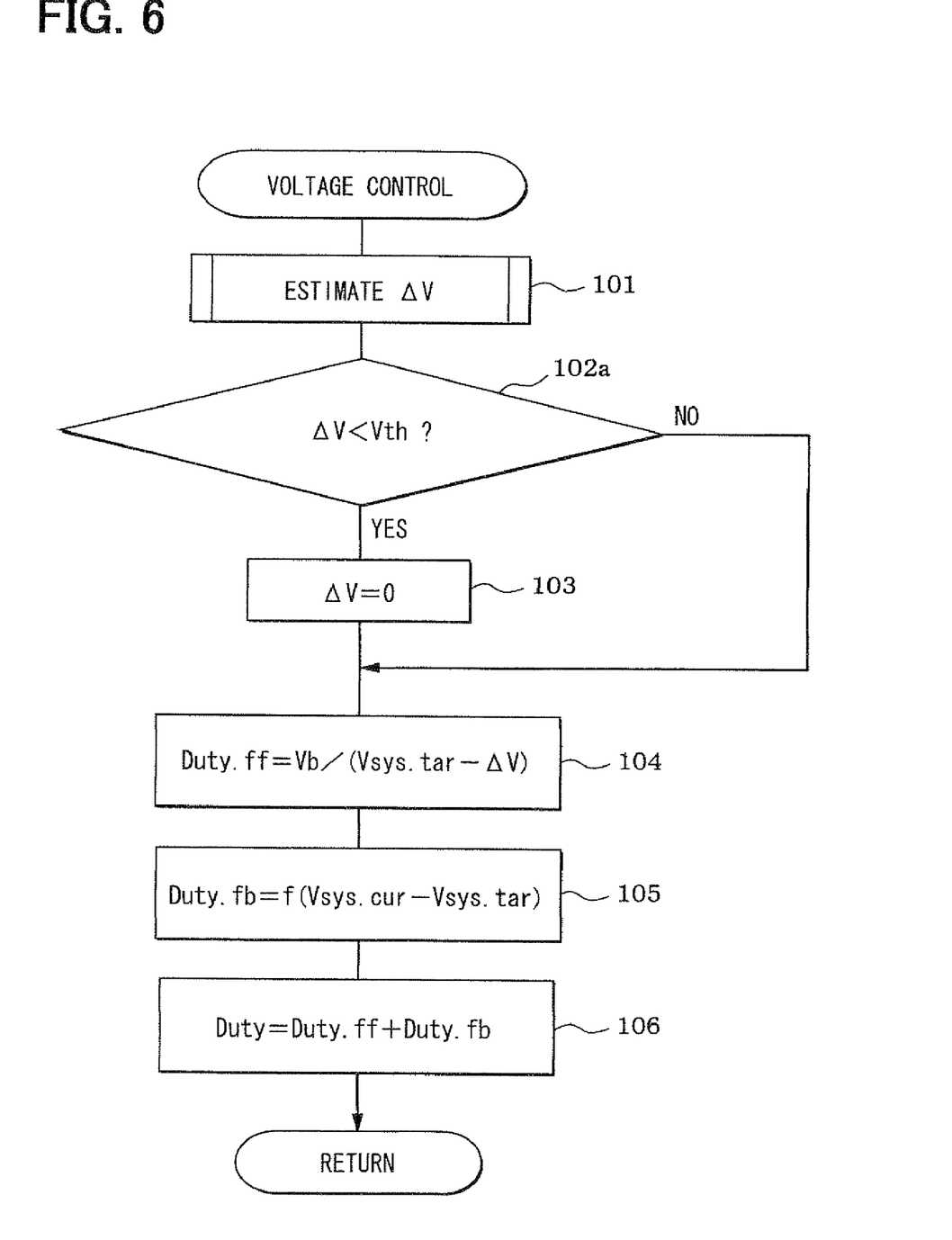
FIG. 6 is a flow chart showing a voltage control routine according to a second embodiment of the present invention.

Next, a second embodiment of the present invention is described referring to FIG. 6. In the following description and drawings, the same reference numbers and symbols are given to components and parts which are the same or similar to that already described in the preceding embodiments. The preceding description may be referred to for the components and parts denoted by the same reference numbers and symbols. Hereinafter, differences from the preceding embodiments are mainly explained.

In the second embodiment, the controller 32 executes a voltage control routine in FIG. 6. The controller 32 performs a voltage stabilization control, i.e., a voltage regulating control, which uses and reflects the estimated voltage fluctuation ΔV, only when the estimated voltage fluctuation ΔV is in a direction to increase the system voltage.

In a step 102a, the controller 32 determines that whether the estimated voltage fluctuation ΔV is smaller than a predetermined threshold value Vth or not. In other words, in the step 102a, it is determined that whether the estimated voltage fluctuation ΔV indicates a direction of decreasing the system voltage Vsys or not. The predetermined threshold value Vth may be set at 0V, for example. For performing the determination in the step 102a, the total power fluctuation ΔP may be used instead of the estimated voltage fluctuation ΔV. In this case, the controller 32 controls the voltage converter 14 according to the estimated voltage fluctuation ΔV, only when the power fluctuation ΔP on the unit 21 and 22 is in a direction to increase the system voltage.

If it is determined that the fluctuation is in a decreasing direction of the system voltage Vsys in the step 102a, it is possible to assume that the system voltage Vsys never reach to an excessive level. Therefore, the routine proceeds to the step 103.

On the other hand, if it is determined that the fluctuation is in an increasing direction of the system voltage Vsys in the step 102a, it is possible to assume that the system voltage Vsys may reach to an excessive level and an excessive high voltage may be applied to electric components. In this case, the controller 32 jumps processing of the step 103 and proceeds to the step 104.

In the second embodiment, the controller controls the voltage converter according to the estimated voltage fluctuation only when the estimate voltage fluctuation is in a direction to increase the system voltage. As a result, it is possible to prevent an excessive voltage to the electric components caused by an excessive system voltage certainly. In addition, it is possible to avoid a voltage stabilization control according to the estimated voltage fluctuation more than needed.

Third Embodiment

Figure 7:
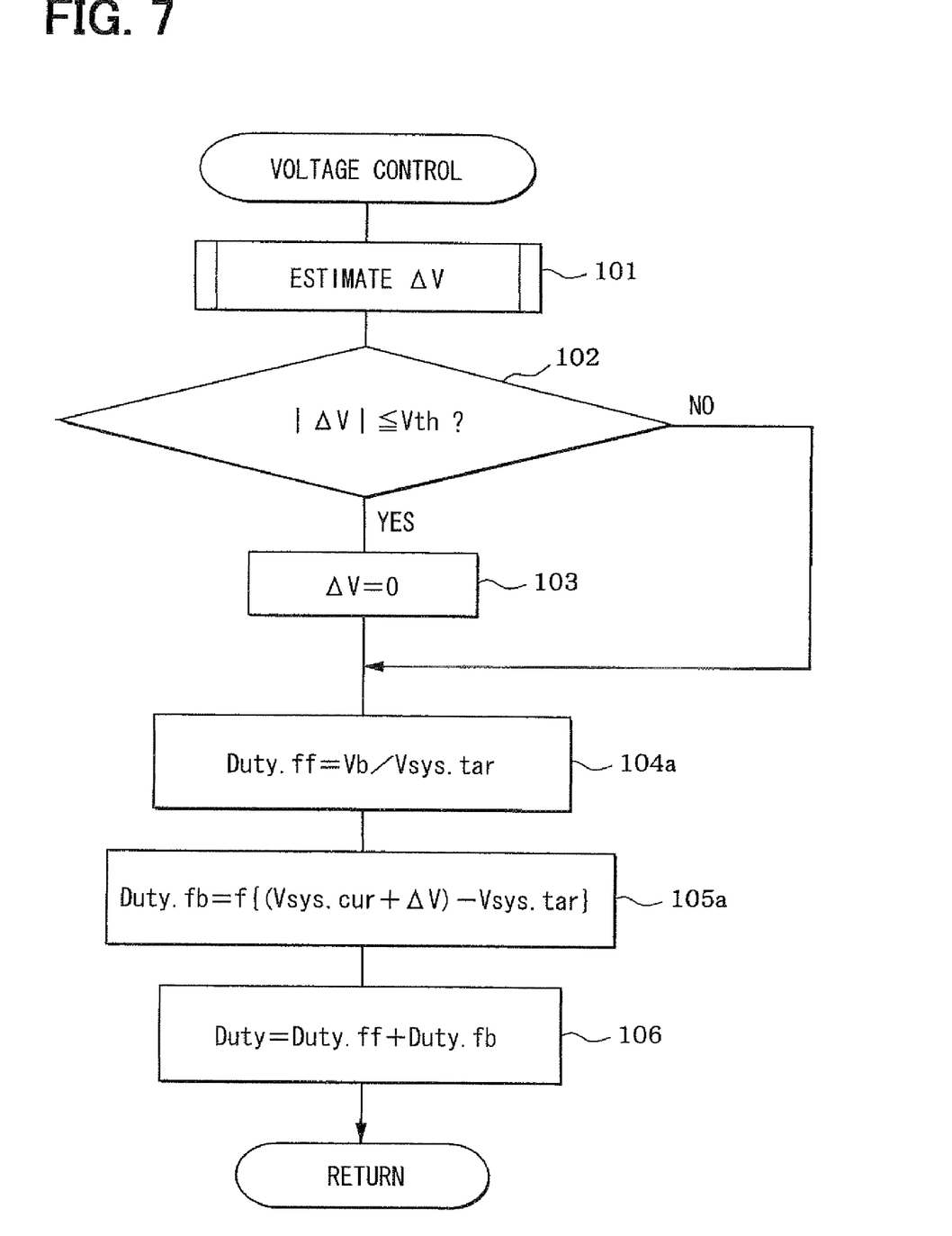
FIG. 7 is a flow chart showing a voltage control routine according to a third embodiment of the present invention.

Next, a third embodiment of the present invention is described referring to FIG. 7.

In the third embodiment, the controller 32 executes a voltage control routine shown in FIG. 7. The controller 32 corrects the feed-back control amount Duty.fb for the converter 14 by using the estimated voltage fluctuation ΔV. The controller 32 provides means for correcting the feed-back control amount Duty.fb for controlling the voltage converter 14 by using the estimated voltage fluctuation ΔV. The feed-back control amount Duty.fb is calculated so that a difference between the target voltage Vsys.tar and the detected voltage Vsys.cur becomes small. The estimated voltage fluctuation ΔV is reflected on the voltage stabilization control via the feed-back control amount Duty.fb.

In a step 104a, a feed-forward control amount Duty.ff for controlling the converter 14 is calculated so that the output voltage of the converter 14 approaches to the target voltage Vsys.tar based on the output characteristic of the converter 14. The feed-forward control amount Duty.ff calculated in the step 104a is a base component. The following expression is calculated in the step 104a.

$$Duty.ff = Vb/Vsys.tar$$

In a step 105a, a feed-back control amount Duty.fb for controlling the converter 14 is calculated by using a PI control method or a PID control method so that a difference between the detected voltage Vsys.cur and the target voltage Vsys.tar becomes small. In the step 105a, the detected voltage Vsys.cur is corrected based on the estimated voltage fluctuation ΔV. As a result, a corrected feed-back control amount Duty.fb is obtained. The following expression is calculated in the step 105a.

$$Duty.fb = f\{(Vsys.cur + \Delta V) - Vsys.tar\}$$

Thereby, the estimated voltage fluctuation ΔV is reflected on the feed-back control amount Duty.fb. In the case of the estimated voltage fluctuation ΔV=0, the estimated voltage fluctuation ΔV is not reflected.

In the third embodiment, a voltage stabilization control based on the estimated voltage fluctuation ΔV is performed by correcting the feed-back control amount Duty.fb by using the estimated voltage fluctuation ΔV. According to the third embodiment, the same advantages as in the preceding embodiments can be acquired. In the third embodiment, the controller may be configured to control the voltage converter according to the estimated voltage fluctuation ΔV only when the estimate voltage fluctuation is in a direction to increase the system voltage.

The correcting method for a voltage control using the estimated voltage fluctuation in the preceding embodiments can be modified. For example, the input voltage Vb which is used for calculating the feed-forward control amount Duty.ff may be corrected based on the estimated voltage fluctuation ΔV. For example, in the third embodiment, the target voltage Vsys.tar may be corrected based on the estimated voltage fluctuation ΔV.

For example, both the feed-forward control amount Duty.ff and the feed-back control amount Duty.fb may be corrected based on the estimated voltage fluctuation ΔV.

The power fluctuation on at least one unit may be calculated based on a command value for controlling the unit other than the torque command value used in the preceding embodiments. For example, the power fluctuation of the unit may be calculated based on a command value, such as a voltage command value and/or a current command value for the AC machine.

Alternatively, since a detected value on at least one unit indicates a controlling condition of the unit, the power fluctuation of the unit may be calculated based on a detected value, such as a detected current value flowing the AC machine. In other word, the estimated voltage fluctuation ΔV may be estimated based on the detected value. In detail, the controller 32 calculates a torque based on the detected current value of the AC machine, and calculates an electric power based on the torque and a rotating speed, and then, calculates a power fluctuation per unit time by calculating a difference between the electric power calculated at the last time and the electric power calculated at this time. Since the detected current value of the AC machine is data which reflects an actual electric power of the unit with sufficient accuracy, it is possible to calculate the power fluctuation of the unit with sufficient accuracy based on the detected current value of the AC machine. The power fluctuation on the unit may be calculated based on a detected value indicative of a controlling condition of the unit other than the above described examples.

The present invention may be applied to any vehicle not limited to the hybrid car which uses both the AC machine and the engine as the power source. The present invention may be applied to a vehicle which uses only the AC machine as the power source. Further, the present invention may be applied to a vehicle having a single unit or more than three units.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A power controller for electric vehicle, comprising:
    a voltage converter which converts a voltage supplied from a DC power source to a system voltage and supplies the system voltage to a power line; at least one unit including an inverter connected with the power line and an AC machine connected with the inverter;
    means for estimating a voltage fluctuation of the system voltage based on a power fluctuation generated on the unit; and
    means for controlling the voltage converter to stabilize the system voltage based on the estimated voltage fluctuation estimated in the estimating means.

2. The power controller for electric vehicle according to claim 1, wherein
    the estimating means includes: means for calculating a power fluctuation on the unit based on a command value for controlling the unit; and means for calculating the estimated voltage fluctuation based on the power fluctuation.

3. The power controller for electric vehicle according to claim 1, wherein
    the estimating means includes: means for calculating a power fluctuation on the unit based on a detected value indicative of a controlling condition of the unit; and means for calculating the estimated voltage fluctuation based on the power fluctuation.

4. The power controller for electric vehicle according to claim 1, wherein
    the controlling means includes means for correcting a feed-forward control amount for controlling the voltage converter by using the estimated voltage fluctuation, the feed-forward control amount being calculated based on an output characteristic of the voltage converter so that the output voltage of the converter approaches to a target voltage of the system voltage.

5. The power controller for electric vehicle according to claim 1, wherein
    the controlling means includes means for correcting a feed-back control amount for controlling the voltage converter by using the estimated voltage fluctuation, the feed-back control amount being calculated so that a difference between a target voltage of the system voltage and a detected voltage of the system voltage becomes small.

6. The power controller for electric vehicle according to claim 1, wherein
    the controlling means includes means for inhibiting a control of the voltage converter according to the estimated voltage fluctuation when the power fluctuation on the unit or the estimate voltage fluctuation is less than a predetermined value.

7. The power controller for electric vehicle according to claim 1, wherein
    the controlling means controls the voltage converter according to the estimated voltage fluctuation only when the power fluctuation on the unit or the estimated voltage fluctuation is in a direction to increase the system voltage.

* * * * *